United States Patent

Marshall

[15] 3,639,729

[45] Feb. 1, 1972

[54] DATA READING APPARATUS

[72] Inventor: Ray A. Marshall, Park Ridge, Ill.

[73] Assignee: SCM Corporation, New York, N.Y.

[22] Filed: Feb. 17, 1969

[21] Appl. No.: 799,733

[52] U.S. Cl. ....................235/61.11 E, 178/17, 250/219 DC, 313/108 D, 340/173 L

[51] Int. Cl. ..................H04l 15/18, H01j 1/52, G01n 21/30, G06k 7/14, G11b 19/00

[58] Field of Search ....................307/311; 313/108 A, 108 B, 313/108 C, 108 D; 235/61.115, 61.115 PR, 61.12; 250/219 D, 219 DC; 340/173, 174.1 A; 318/254

[56] References Cited

UNITED STATES PATENTS

| | | | |
|---|---|---|---|
| 2,295,000 | 9/1942 | Morse | 235/61.115 |
| 3,207,845 | 9/1965 | Swenson | 178/17 |
| 3,223,979 | 12/1965 | Dirks | 340/172.5 |
| 3,229,073 | 1/1956 | Macker | 235/61.115 |
| 3,443,109 | 5/1969 | Broom | 250/217 |
| 3,443,166 | 5/1969 | Ing | 317/234 |
| 3,501,676 | 3/1970 | Adler | 313/108 |
| 3,419,710 | 12/1968 | Mathews | 235/61.11 |
| 3,470,357 | 9/1969 | Ritzerfeld | 235/61.11 |
| 3,474,232 | 10/1969 | Hearn | 235/61.115 |
| 3,518,659 | 6/1970 | Chynoweth | 340/347 |
| 2,855,539 | 10/1958 | Hoover | 340/173 L |
| 3,096,441 | 7/1963 | Burkhardt | 340/173 L |
| 3,359,474 | 12/1967 | Welch | 318/254 |
| 3,454,930 | 7/1969 | Schoeneman | 340/174.1 A |
| 3,502,187 | 3/1970 | Becking | 250/219 ID |
| 3,534,360 | 10/1970 | Hafle | 340/347 PR |

*Primary Examiner*—Daryl W. Cook
*Assistant Examiner*—Robert M. Kilgore
*Attorney*—Mason, Kolehmainen, Rathburn & Wyss

[57] ABSTRACT

Data groups are read from a perforated medium by an array of light emitting diodes. Light from the diodes passes through a cylindrical lens, through the perforated medium, and onto an array of photodetectors which detect the perforations. Illumination power for the light emitting diodes comes from a capacitor which is connected to the diodes by a controlled rectifier. The data reading process and the motion of the medium are synchronized either by controlling tape motion with a switch-tail ring counter controlled stepping motor, or by inductively sensing magnetic elements which move synchronously with the perforated medium. Data bits retrieved from the medium are placed into a shift register, and are then shifted out of the register in the form of a teleprinter code. A new data group is automatically read as soon as this shift register becomes empty. The shift register may be easily reprogrammed so as to generate any desired teleprinter code. A NULL and DELETE data group detection circuit erases these groups from the shift register and thereby greatly speeds up the teleprinter code generation process.

15 Claims, 9 Drawing Figures

Inventor
RAY A. MARSHALL
Mason, Kolehmainen, Rathburn & Wyss
Attorneys.

Inventor
RAY A. MARSHALL

Mason, Kolehmainen, Rathburn & Wyss
Attorneys

Inventor
RAY A. MARSHALL
Mason, Kolehmainen, Rathburn & Wyss
Attorneys

Inventor
RAY A. MARSHALL

Mason, Kolehmainen, Rathburn & Wyss
Attorneys

Inventor
RAY A. MARSHALL
Mason, Kolehmainen, Rathburn & Wyss
Attorneys

DATA READING APPARATUS

The present invention relates to apparatus for reading data from a perforated medium, and more particularly to a data reader that incorporates the data into a teleprinter signal suitable for transmission over a single wire.

In the past, data readers have customarily extracted data from a perforated medium by transmitting light generated by an incandescent lamp through the perforations and onto an array of photodetectors, one for each possible perforation. Each photodetector then generates a signal representing one data bit. These signals are amplified, applied to the parallel data input of a shift register, and are loaded into the shift register when the medium is properly positioned adjacent the array of photodetectors by a stepping motor. Teleprinter bit timing signals are then used to shift the data bits serially out of the shift register, one bit at a time, thus forming a teleprinter signal. After an interval of sufficient length to allow the bit timing signals to shift all of the bits out of the shift register, the stepping motor is advanced one step, and the entire process is repeated.

Data readers of this type have many undesirable features. The incandescent lamp includes a delicate tungsten filament which not only can burn out, but which also can easily be broken by shock or vibration. In portable equipment, it is usually necessary to include a supply of spare lamps within every reader, and to design the reader so that the lamp can be quickly changed in the field. Due to the effect which varying friction between the medium and its guides has upon the stepping motor, considerable variation in the positioning of the medium with respect to the photodetector array can occur. This can cause occasional erroneous reading of the perforations. Usually the shift register is permanently arranged to generate one particular type of teleprinter code containing a set number of bits, and cannot be easily modified to transmit other types of codes, especially codes containing a greater or smaller number of bits. A typical reader includes no means for recognizing and for suppressing the transmission of NULL and DELETE characters, and no means for greatly increasing the perforation scanning rate when unperforated or fully perforated sections of the medium are adjacent the photodetector array.

A primary object of the present invention is the production of a perforated medium reader that is more rugged and more reliable than those used in the past, and that is additionally able to generate any desired format of teleprinter output signal that may be desired to suit a particular application.

Another object of the present invention is to design a perforated tape reading device which utilizes rugged, low-power light emitting diodes in place of incandescent lamps. These diodes draw minimal amounts of power and do not require periodic replacement.

A further object of the present invention is to obtain a simple and reliable circuit for controlling a stepping motor which can advance the stepping motor through a fixed number of positions between each reading, and which therefore greatly reduces the effects which changes in friction and drag can have on the positioning of the perforations.

Another object of the present invention is the production of a reader that includes a teleprinter code generator which can be easily modified to generate teleprinter codes having any desired number of bits and any desired start and stop codes, and which does not have to transmit the shorter five-bit codes at the same slow speed at which it transmits the longer eight-bit codes.

Another object of the present invention is the production of a perforated tape reading device that can skip rapidly over NULL and DELETE characters as well as blank or fully perforated sections of the medium.

In accordance with these and many other objects, a preferred embodiment of the present invention comprises a perforated tape reader which uses light emitting diodes as a light source to illuminate the perforations in a perforated tape. A cylindrical lens focuses the light emitted by the diodes through the perforations and onto an array of photodetectors mounted beneath the tape. The light emitting diodes are connected to an energy storage capacitor by a controlled rectifier. When the rectifier is triggered, a current of several amperes flows through the light emitting diodes for a few microseconds and produces an intense flash of light. The size of the storage capacitor is such that the amount of power transferred into the diodes is not sufficiently large to cause any damage to the light emitting diodes. The power drain of this illumination system is extremely small, and it is especially suitable for use in portable, battery-powered readers.

The output signals generated by the photodetectors are amplified and are fed into stages of a shift register, as in a conventional reader. Other signals are fed into other stages of the shift register, depending upon the particular code which is to be transmitted. Usually a ground level START bit is fed into the second stage, and one or more positive level STOP bits are fed into the stages just beyond the stages containing data bits. Any remaining stages are supplied with ground level signals. Outputs from each stage except for the first are fed into a gate which generates a signal whenever the shift register is empty. This signal initiates the process of loading more data into the shift register as soon as a set of data bits has been transmitted, and thus keeps the time required to transmit each set of data bits to a minimum. A five-bit code, for example, is transmitted much more quickly than an eight-bit code, because this signal loads more data into the shift register immediately after the last STOP bit is shifted out of the shift register, regardless of the number of bits transmitted. If it is desired to have the reader adaptable to the transmission of codes having different bit lengths, a switch or logic network can be provided to allow quick alteration of the input connections to each stage of the shift register.

If a null (no perforations) or DELETE (all perforations) character is loaded into the shift register, it will be detected by a special logic circuit, and the shift register will be immediately cleared before the data is transmitted. The reader then will proceed to the next group of perforations without any further delay. No time is wasted in the transmission of NULL or DELETE characters, and blank or fully perforated sections of tape are quickly advanced through the reader without transmission.

The perforated tape is advanced through the reader by means of a stepping motor which is geared so that the motor must advance through four successive stepping positions to advance the tape from one set of perforations to the next. In this manner, the stepping motor can be off by almost half of a stepping position due to friction or drag without there being any detrimental error in tape positioning. The signals controlling the operation of the stepping motor are generated by a switch-tail ring counter circuit which includes two flip-flops each generating two output signals. Each of these output signals is fed to one winding of the stepping motor. Clock pulses for advancing the ring counter come through a first gate that is controlled by a second gate. This second gate receives as inputs an output from each of the two-flip-flops. Once clock pulses begin to flow into the ring counter, they continue to flow until the counter has counted all the way back to its initial state. This causes the stepping motor to advance through exactly four steps, which is the desired result. By changing the position of the switch-tail within the ring counter, this simple arrangement can easily be arranged to count backwards.

In another embodiment of the present invention, a reader similar to the one described above is used to scan the perforations on a spinning disc associated with a drum type of printer. Since the spinning disc never stops rotating, timing pulses for synchronizing the reading process are obtained by an inductive pickup which senses the passage of magnetic elements beneath its surface. These magnetic elements are spread out around the spinning disc adjacent individual groups of perforations. The signals thus read are fed to comparison circuits to control the actuation of print hammers which do the actual printing.

The invention, together with further objects and advantages thereof, will best be understood from considering the following detailed description in conjunction with the drawings in which:

FIG. 1 also includes a schematic diagram of the circuitry used to energize the light emitting diodes, and a diagrammatic representation of the photodetector data amplifiers and parallel to serial converter;

Figure 1:
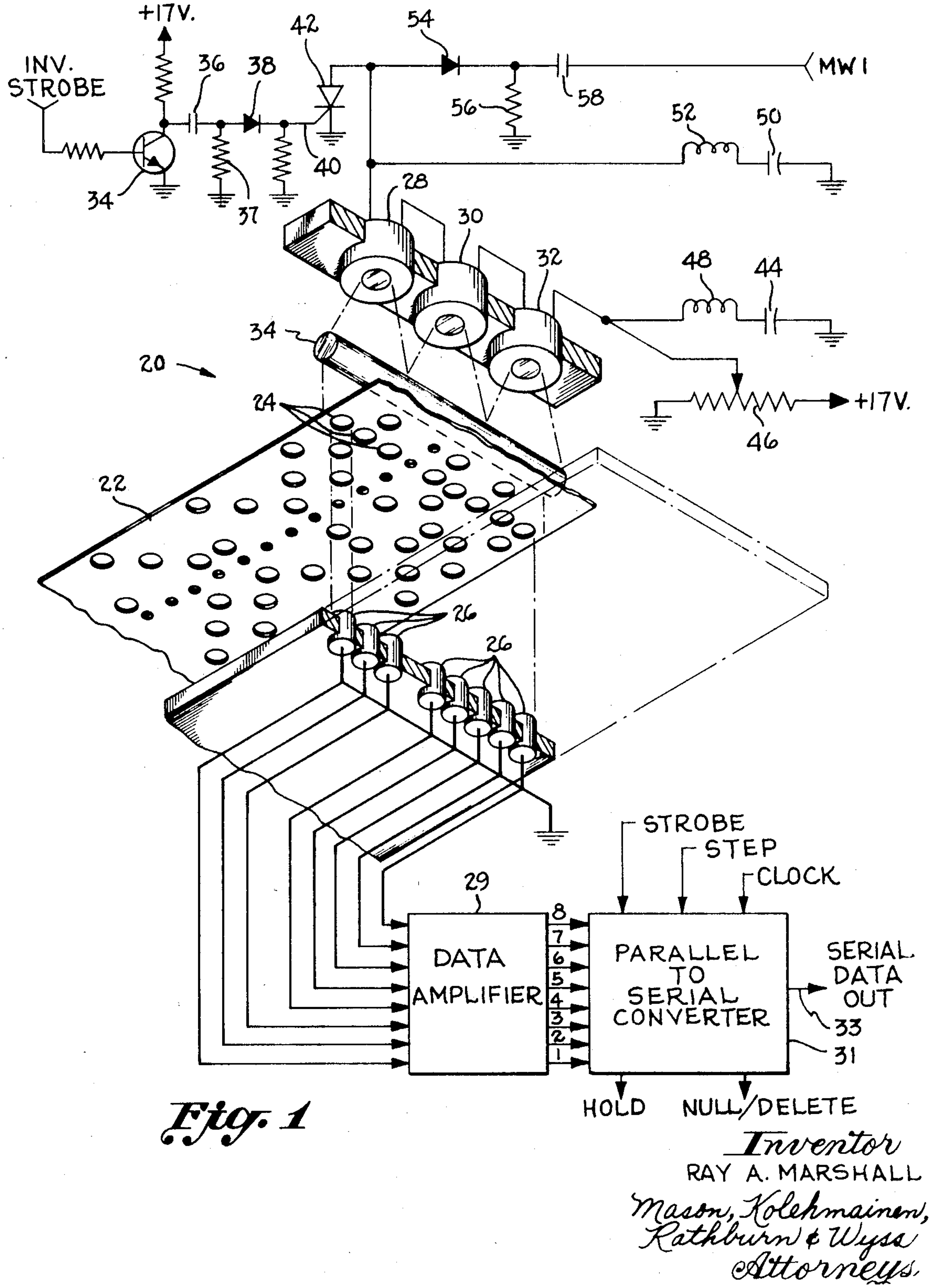
FIG. 1 is an exploded perspective view, partly in section, of the optical system used in one embodiment of the present invention.

Referring now to FIG. 1, a reader characterized by features of the present invention is designated generally as 20. A perforated tape 22 is driven through the reader 20 by a stepping motor (not shown). The perforated tape 22 is always stopped so that a group of perforations 24 are lined up directly adjacent an array of photodetectors 26. Light from three light emitting diodes 28, 30 and 32 is then projected through a cylindrical lens 34 and onto those of the photodetectors 26 which are not blocked by the tape 22. The resultant signals generated by the photodetectors 26 are amplified by data amplifiers 29. In the embodiment shown in FIG. 1, eight such signals are detected and amplified. The output signals flowing from the data amplifiers 29 are labeled 1, 2, . . . , and 8. These signals are fed to a parallel to serial converter 31 where they are converted into a teleprinter signal. The teleprinter signal appears at the serial data out terminal 33 of the converter 31.

The light emitting diodes 28, 30 and 32 are momentarily illuminated in response to an INV. STROBE (inverted strobe) signal. This signal is inverted and amplified by a transistor amplifier 34 and is transferred by a capacitor 36 and a diode 38 to the trigger terminal 40 of a silicon controlled rectifier 42. The capacitor 36 and a resistor 37 ensure that only a brief pulse reaches the control terminal 40, and the diode 38 protects the silicon controlled rectifier 42 from negative pulses generated by the capacitor 36 when the INV. STROBE signal goes positive. The three light emitting diodes 28, 30 and 32 are connected in series with one another and with the controlled rectifier 42. Excitation power for the light emitting diodes comes from a capacitor 44, which is normally trickle charged to a voltage determined by the setting of a potentiometer 46. The potentiometer 46 is included to compensate for the varying transmissiveness of different types of perforated tapes 22.

When an INV. STROBE pulse causes the silicon controlled rectifier 42 to conduct, a conduction path is established from one end of the capacitor 44, through an inductor 48 and the light emitting diodes 28, 30 and 32, through the silicon controlled rectifier 42, and through ground back to the other end of the capacitor 44. The inductor 48 extends the illumination period to several microseconds by delaying the discharge of the capacitor 44, and compensates for a delay in the time it takes the photodetectors 26 to reach maximum levels of light detection. While the capacitor 44 is relatively small, it momentarily supplies a current of several amperes to the light emitting diodes 28, 30 and 32, and therefore an extremely intense light is projected by the diodes 28, 30 and 32 and a cylindrical lens 34 onto the photodetectors 26. The duration of this surge of current is kept short enough so that no heat damage results. A ringing circuit comprising a relatively large inductor 52 and a capacitor 50 causes the voltage at the anode of the controlled rectifier 42 to go negative and thereby turns off the controlled rectifier 42. When the reader 20 is first turned on, the controlled rectifier 42 may be conductive, and there may be no way to turn it off with the elements 50 and 52. Therefore a secondary turnoff pulse is applied to the rectifier 42 by a diode 54, a resistor 56, and a capacitor 58 which connect the anode of the diode 42 to an MW1 (motor winding 1) signal, which is generated each time the stepping motor advances. The diode 54 insures that only negative spikes generated by the capacitor 58 and resistor 56 are applied to the anode of the controlled rectifier 42.

Figure 2:
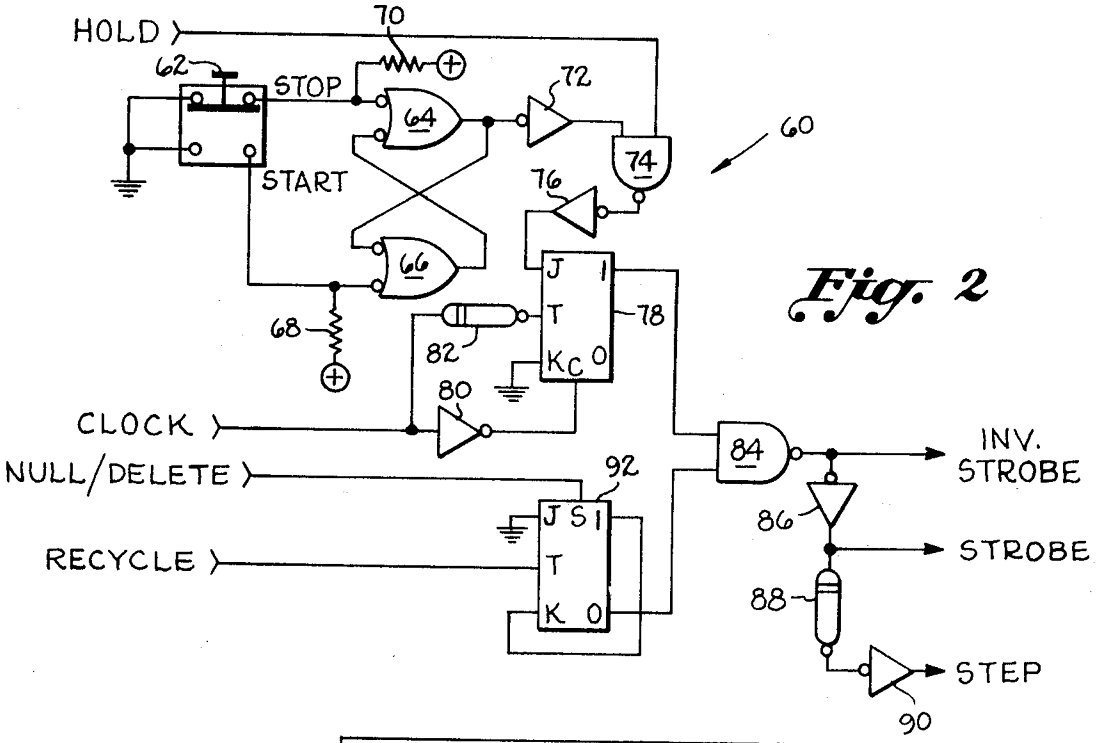
FIG. 2 is a logic diagram of a control circuit suitable for controlling the optical system shown in FIG. 1.

Referring now to FIG. 2, there is shown a control circuit 60 which is suitable to control the reader 20 shown in FIG. 1. This control circuit 60 generates the INV. STROBE (inverted strobe) signal which causes the reader to read a group of data perforations, and it also generates STROBE and STEP signals which respectively load data into the parallel to serial converter 31, and cause the stepping motor 100 (FIG. 3) to advance. The circuit 60 is energized by depression of a START-STOP pushbutton 62. This pushbutton is mechanically of the type which goes all the way down when first pressed, and which does not return to its initial position until pressed again. The pushbutton 62 alternately supplies ground level signals to a bistable 64–66 which comprises gates 64 and 66, and resistors 68 and 70. A bistable is a simple form of flip-flop that is constructed by cross-connecting the inputs and the outputs of two integrated circuit gates. When an input to one of the two gates comprising a bistable is grounded, it causes the output of that gate to go positive, and the output of the adjacent gate to go negative. The outputs of the two gates remain in this state until an input to the other of the two gates is run to ground, at which time the outputs of the two gates reverse their polarities. Initially, the switch 62 supplies a ground potential to an input of the gate 64, so initially the output of the gate 64 is positive. When the pushbutton 62 is depressed, it supplies ground level potential to an input of the gate 66, and thus causes the output of the gate 64 to go to ground. Since the pushbutton 62 does not return to its initial position until depressed a second time, the output of the gate 64 remains at ground until the pushbutton 62 is again depressed. In this manner, the bistable 64–66 converts the operation of the switch 62 into a clean control signal which appears at the output of the gate 64. This signal is inverted by a gate 72 and is applied to one input of a NAND-gate 74. Under normal circumstances, this signal passes through the gate 74 and the inverting gate 76 and is applied directly to a J terminal of a J–K flip-flop 78.

The flip-flop 78 generates pulses which cause data to be read by the reader 20 (FIG. 1). CLOCK pulses supplied by a teleprinter bit rate timing clock (not shown) are inverted by a gate 80 and are applied to a clear terminal of the flip-flop 78, thus periodically placing the flip-flop 78 in the 0 state and causing a ground level signal to appear periodically at the 1 output of the flip-flop 78. Clock pulses are also delayed by passage through a delay unit 82 and are applied to a toggle input of the flip-flop 78 to set the flip-flop 78 wherever the J terminal of the flip-flop is supplied with a positive level signal. When the flip-flop 78 is set in this manner, it partially enables a gate 84. Normally the remaining input to the gate 84 is positive, so the output of the gate 84 goes negative and generates an INV. STROBE (inverted strobe) signal each time the flip-flop 78 is set. A gate 86 inverts this signal and produces the STROBE signal. A delay unit 88 and an inverting amplifier 90 produce a delayed strobe pulse which is the STEP signal. This STEP signal causes the stepping motor 100 (FIG. 3) to advance the perforated tape to the next data group location.

As mentioned above, the INV. STROBE signal causes data to be read from the perforated tape, and the STROBE signal causes this same data to be loaded into the parallel to serial converter 31 (FIG. 1). It is now necessary to prevent any more INV. STROBE or STROBE pulses from being generated until this data has been converted into a teleprinter signal and has been transmitted. For this reason, the parallel to serial converter 31 (FIG. 1) generates a ground level HOLD signal when it is generating a teleprinter signal. This HOLD signal disables the gate 74 (FIG. 2) and causes the J terminal of flip-flop 78 to remain at ground potential. As explained above, the flip-flop 78 is cleared by the gate 80 when the current CLOCK pulse comes to an end, and this terminates the INV. STROBE and the STROBE signals. Since the J terminal of a flip-flop 78 is now at ground potential, the flip-flop 78 cannot be set by subsequently generated CLOCK pulses. The control circuit 60 remains in this standby state until the parallel to serial converter has finished forming a teleprinter character. Then the HOLD signal is terminated and the flip-flop 78 is again allowed to generate an INV. STROBE signal. This reinitiates the data reading process.

In order to speed up process of reading data, it is desirable to prevent the HOLD signal from being generated when a section of perforated medium 22 is being read which contains no transmittable data. Generally, this will either be a section of tape which has no perforations (NULL characters) or section of tape which is fully perforated (DELETE characters--for example, the perforation group 24 shown in FIG. 1 represents a DELETE character). These two special conditions are detected by the parallel to serial converter 31 (FIG. 1). In response to detection of such signals, the parallel to serial converter 31 generates a NULL/DELETE signal. This signal is fed back to the control circuitry 60 (FIG. 2) and sets a flip-flop 92. The flip-flop 92 toggles into the 1 state, and the 0 output of the flip-flop 92 disables the gate 84 and causes the output of the gate 84 to go positive prematurely, before the end of the current CLOCK pulse. This prematurely terminates the INV. STROBE and the STROBE signals. As will be explained below, early termination of the STROBE signal prevents the HOLD signal from being generated. Since no HOLD signal is generated, the J terminal of the flip-flop 78 does not go to ground, and succeeding CLOCK pulses are allowed to periodically set and clear the flip-flop 78. The gate 84 remains disabled until the stepping motor has advanced the perforated tape to the next data group position, and thus suppresses the premature generation of STROBE or INV. STROBE pulses before the tape is in position adjacent the photodetectors. When the stepping motor has finished this task, a RECYCLE signal from the stepping motor control circuit toggles the flip-flop 92, and the gate 84 is enabled once again. The next time that the flip-flop 78 is set by a CLOCK pulse, it again causes the gate 84 to generate an INV. STROBE signal and to read the next data group. In this manner, NULL and DELETE data codes are passed over by the reader 20 (FIG. 1) just as fast as the stepping motor can operate and no time is wasted in the generation of teleprinter codes representing those characters not required to be recognized.

Figure 3:
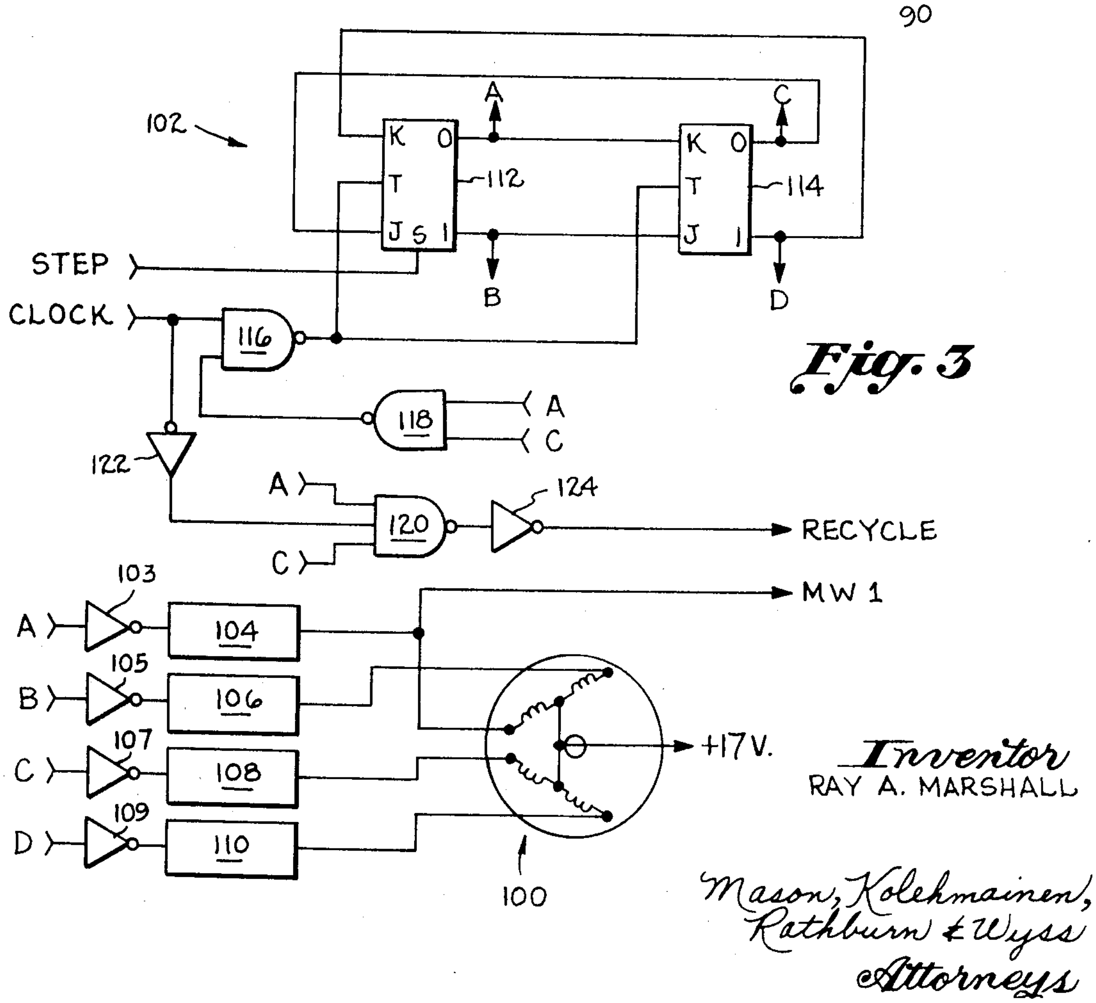
FIG. 3 is a logic diagram of control circuitry for a tape drive stepping motor suitable for use with the optical system shown in FIG. 1.

FIG. 3 shows the stepping motor 100, and also the motor control circuitry 102 which governs the operation of the stepping motor 100. The control circuitry 102 generates four motor control signals A, B, C and D which are respectively inverted by gates 102, 105, 107, and 109; amplified by level converters 104, 106, 108 and 110; and applied to the four windings of the stepping motor 100. The output of the level converter 104 is called the MW1 (motor winding 1) signal. As mentioned above, this signal is used to turn off the controlled rectifier 42 (FIG. 1) when the reader 20 is first energized.

The control circuitry 102 comprises two flip-flops 112 and 114 interconnected to form a switch-tail ring counter circuit. More specifically, the 1 and 0 outputs of the flip-flop 112 are fed directly into the J and K inputs of the flip-flop 114, while the 1 and 0 outputs of the flip-flop 114 are interchanged with one another before being fed into the K and J inputs of the flip-flop 112. A ring counter results which circulates data bits between the two flip-flops 112 and 114, but which reverses the sign of each data bit when the data passes from the flip-flop 114 to the flip-flop 112. This counter circuit advances the data bits when the flip-flops 112 and 114 are simultaneously toggled by CLOCK pulses supplied by a gate 116. The gate 116 is enabled by another gate 118. The gate 118 receives output signals from each of the two flip-flops 112 and 114, and is therefore always enabled except when the two flip-flops are in one particular state, in this case the 0 state. When both the flip-flop 112 and 114 are in the 0 state, positive level signals are applied to both inputs of the gate 118, and the output of the gate 118 disables the gate 116. This is the normal rest state for the motor control circuit 102.

When it is desired to advance the motor 100, the STEP signal generated by the control circuitry 60 (FIG. 2) sets the flip-flop 112. This causes the 0 output of the flip-flop 112 to go to ground, and thus causes the gate 118 to enable the gate 116. CLOCK pulses now pass through the gate 116 and advance the switch tail ring counter. The first CLOCK pulse causes the flip-flop 114 to toggle into the 1 state; the next CLOCK pulse causes the flip-flop 112 to toggle into the 0 state; and the next CLOCK pulse causes the flip-flop 114 to return to the 0 state. Now the two flip-flops 112 and 114 are once again in the 0 state, and they enable the gate 118 to again disable the gate 116. The switch-tail ring counter circuit repeats this procedure each time a STEP signal is generated. The A, B, C and D signals generated by the flip-flops 112 and 114 cause the stepping motor 100 to advance exactly four steps and then stop. As noted above, this results in greatly improved accuracy in the positioning of the tape within the reader, since if the motor overshoots or undershoots its proper rest position by one-half of a step, the misalignment is not so severe as to cause improper reading of the perforations.

When the stepping motor 100 finally comes to rest, it is necessary to generate a RECYCLE signal to toggle the flip-flop 92 (FIG. 3), as noted above. This RECYCLE signal is generated by a gate 120 which has as inputs the same signals applied to the gate 118 plus the CLOCK signal inverted by a gate 122. The output of the gate 120 can go negative only when the output of the gate 118 is negative—i.e., when the motor 100 has finished advancing. It is the trailing edge of a CLOCK pulse which toggles the flip-flops 112 and 114, and therefore the gate 120 is enabled by the A and C signals just as the CLOCK signal returns to ground. At this time the output of the gate 122 is positive and enables the gate 120. Therefore, right at the end of the motor advance cycle, the output of the gate 120 goes immediately to ground and causes the output of an inverting gate 124 to go positive and generate the RECYCLE signal. The leading edge of this RECYCLE signal toggles the flip-flop 92 shown in FIG. 2, because the 1 output of the flip-flop 92 is connected to the K input of this same flip-flop 92.

Figure 4:
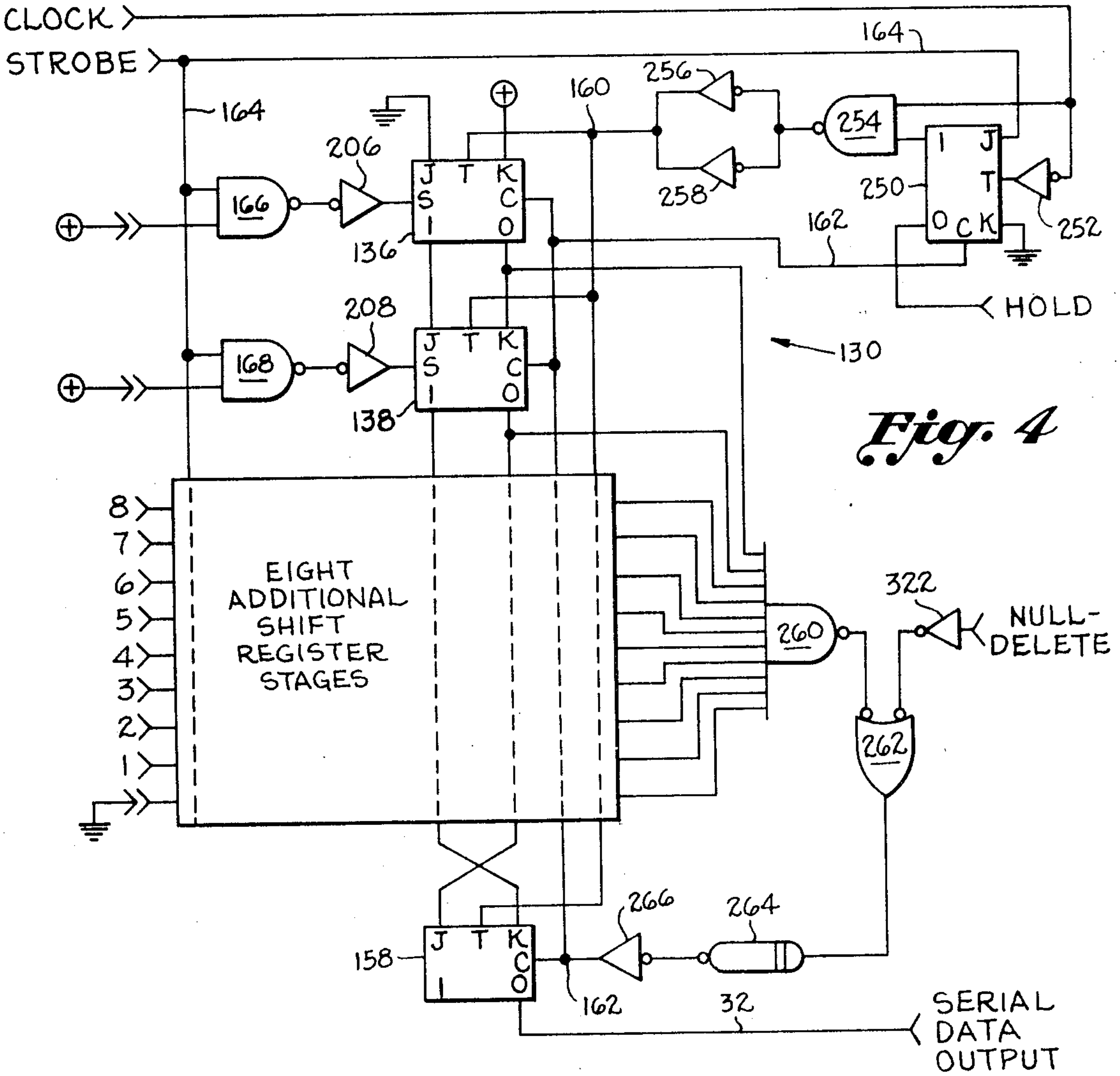
FIG. 4 is a logic diagram of the shift register and control sections of the parallel to serial converter shown diagrammatically in FIG. 1.
Figure 5:
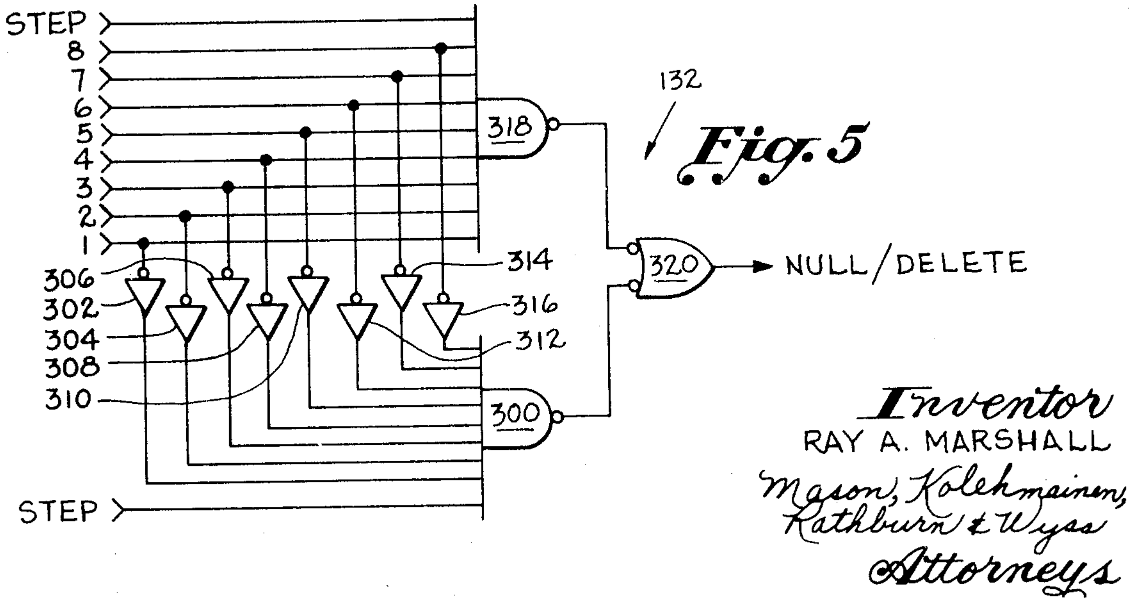
FIG. 5 is a logic diagram of the NULL and DELETE character detection portions of the parallel to serial converter shown diagrammatically in FIG. 1.

FIGS. 4 and 5 are logic diagrams of the parallel to serial converter 31 shown in FIG. 1. FIG. 4 shows the parallel to serial shift register 130, while FIG. 5 shows the NULL and DELETE character detection logic 132. Referring now to FIG. 4, the shift register 130 comprises basically a series of flip-flops 136, 138,. . . , and 158 with their inputs and outputs interconnected to form a shift register. The toggle inputs of these flip-flops are connected to a common toggle line 160, and the clear inputs of these flip-flops are connected to a common clear line 162. The last flip-flop in the chain, the flip-flop 158, is called the output flip-flop. It will be noticed that the input leads to the J and K terminals of the flip-flop 158 are reversed so that the signal which appears at the output of the flip-flop 158 is presented at the 0 output terminal. This terminal is called the SERIAL DATA OUT terminal 33, and it is here that the teleprinter signal ultimately appears.

The set input to each of the flip-flops 136, 138, . . . (excepting the output flip-flop 158) are connected to data loading gates 166, 168, . . . . One input to each of these data loading gates is connected directly to a line 164 carrying the STROBE signal. The remaining inputs to the gate 166, 168, . . . , are connected in such a manner that the proper teleprinter signal is generated at the output of the flip-flop 158. In FIG. 4, the connections for generating the ASCII code are indicated. The lowermost terminal is connected to ground, and represents a one-bit space START code. The next eight terminals are sequentially connected to the data lines 1 through 8 coming from the data amplifiers 28 (shown in FIG. 1). The last two lines are then connected to a positive potential source and represent a two-bit mark STOP code. If some other coding scheme is used, the connections are made in accordance with the requirements of the code. If the code contains fewer bits than the ASCII code, the extra input terminals at the upper end of the shift register are grounded. For example, if only five bits are transmitted, the terminals labeled 6 and 7 would be connected to a positive potential source to represent a two-bit mark STOP code, and the last three terminals would all be grounded. If more than one code is to be used, a switch can be provided to allow easy switching between codes, or the gates 206, 208, . . . can be given an extra set of inputs to receive signals from a second set of data loading gates similar to the gates 166, 168, . . . . In this latter case, code selection is accomplished by switching the line 164 to the proper set of data loading gates.

The shift register 130 functions in the following manner. The STROBE signal loads data into the set terminals of the flip-flops 136, 138, . . . within the shift register leaving only the flip-flop 158 with a positive output representing a continuation of the stop code from the last data group transmitted. The STROBE signal also is applied to the J terminal of the flip-flop 250. The trailing edge of the CLOCK pulse, when it next occurs, is inverted by a gate 252 and applied to the toggle input of a flip-flop 250. This sets the flip-flop 250, and the flip-flop 250 enables a gate 254. Succeeding CLOCK pulses then pass through the gate 254, are inverted by parallel connected gates 256 and 258, and are applied to the toggle line 160. These pulses shift data out of the shift register 130 at the teleprinter bit timing rate. When all of the flip-flops, except the flip-flop 158, are empty, they all will have positive level signals appearing at their 0 outputs. These positive level signals enable a gate 260 to generate a ground level signal which passes through a gate 262, a delay unit 264, and an inverting gate 266 to become a positive clear pulse which is applied to the clear line 162. This clear pulse clears not only the flip-flops 136 through 158, but also clears the flip-flop 250 and thus terminates the process of generating a teleprinter output signal. The HOLD signal which prevented the control circuit 60 (shown in FIG. 2) from functioning while teleprinter signal was generated is the 0 output signal of the flip-flop 250. This HOLD signal goes to ground for the entire period during which the teleprinter signal is generated, and then returns to a positive level once again when the clear pulse is applied to the clear line 162. The clear pulse does not really affect the flip-flop 158, since it has already been cleared by the stop bit which is present at its 0 output.

Referring now to FIG. 5, there is shown the circuitry which is used to detect NULL characters and DELETE characters. NULL characters are sections of the perforated tape where there are no perforations. Such characters are represented by all ground level signals. NULL characters are detected by a gate 300 which receives all eight data signals inverted by inverting gates 302 through 316. DELETE characters comprise eight perforations forming a single group. When an error is made on a teleprinter tape, it is the common practice to punch out the remaining holes, thus forming such a character. DELETE characters are represented by all positive level signals, and are detected by a gate 318. When either a NULL character or a DELETE character is read, one of the two gates 318 or 300 generates a ground level signal and thus causes a gate 320 to generate a positive going NULL/DELETE signal. The two gates 300 and 318 are strobed by the STEP signal (a pulse that occurs shortly after the onset of the STROBE signal, and is generated by logic shown in FIG. 2, as explained above). Shortly after the onset of the signals which cause data to be read and loaded into the shift register 130, the gates 300 and 318 are strobed by the STEP signal. If a NULL or DELETE character is present, the NULL/DELETE signal is generated. This signal sets the flip-flop 92, shown in FIG. 2, and causes the STROBE signal to be terminated prematurely. Premature termination of the STROBE signal causes the J terminal of the flip-flop 250 (shown in FIG. 4) to be at ground potential when the trailing edge of the current CLOCK pulse attempts to toggle the flip-flop 250. Since the flip-flop 250 is not of the master-slave variety, it does not toggle unless the J terminal is positive at the time it is strobed by the trailing edge of the CLOCK signal. Hence, the flip-flop 250 remains cleared. The HOLD signal thus never goes to ground, and the shift register 130 receives no shift pulses. The NULL/DELETE signal is also inverted by a gate 322 and passed through the gate 262, the delay 264, and the gate 266 to become a clear pulse which clears all data out of the shift register 130. This leaves the shift register 130 completely empty of data and ready to receive the next data group.

Figure 6:
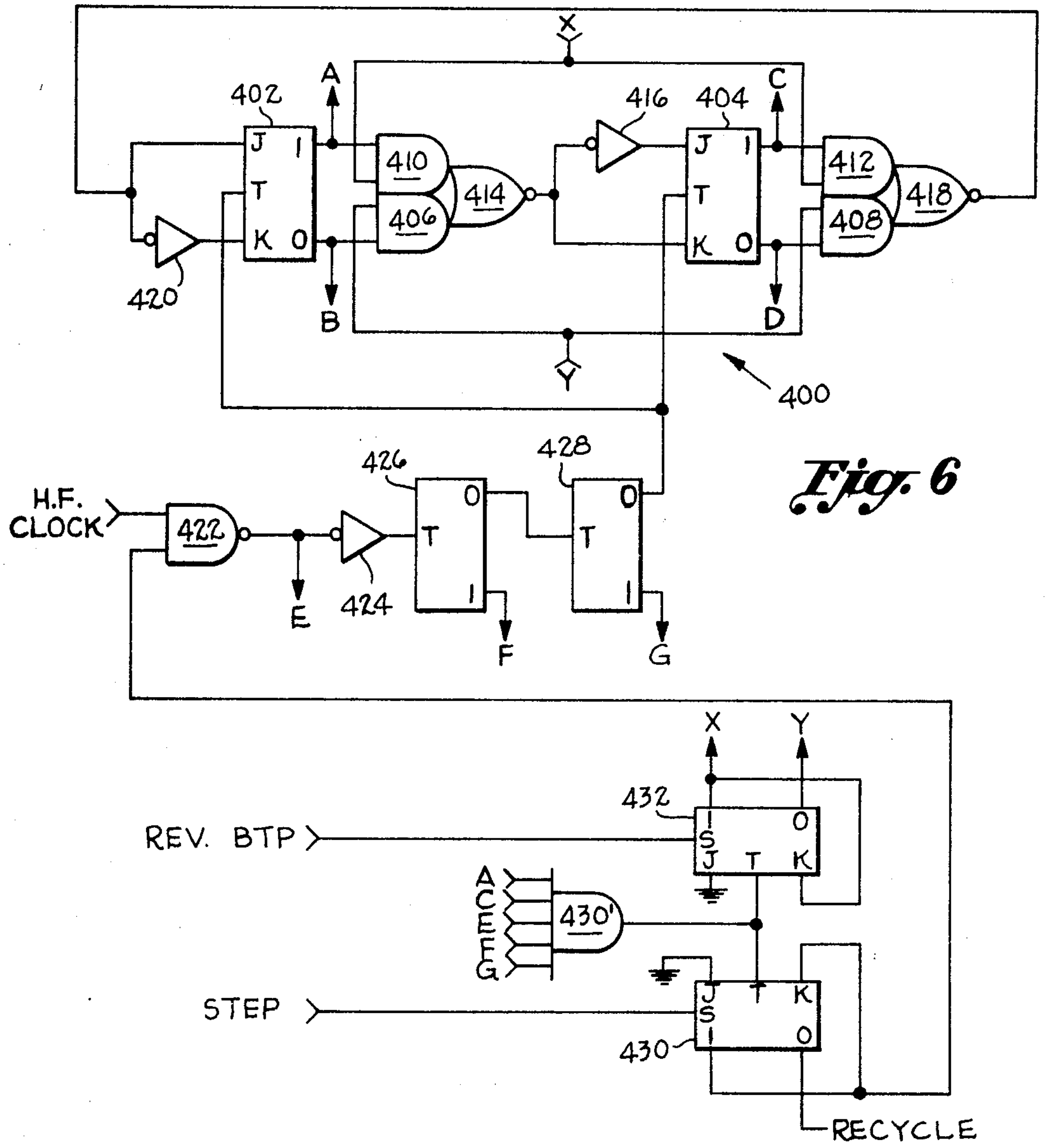
FIG. 6 is a logic diagram of an alternative motor control arrangement which allows the motor to be stepped both forward and backwards.

Referring now to FIG. 6, there is shown a modified form of motor control circuit. This particular control circuit is designed for use in a tape punching unit, and includes means whereby the tape can be backed up. As with the control circuit 102 shown in FIG. 3, the circuit is basically a switch-tail ring counter including two flip-flops 402 and 404. However, the motor control circuit 400 includes a provision whereby the switch in the ring tail can be changed from a position at the output of the flip-flop 402 to a position at the output of the flip-flop 404. Assuming for a moment that the terminal Y is positive and that the terminal X is negative, AND-gates 406 and 408 are enabled while AND-gates 410 and 412 are disabled. Hence, the 0 output of the flip-flop 402 is passed through the gate 406, inverted by a NOR-gate 414 and applied in an inverted form to the K input of the flip-flop 404. This same signal is again inverted by a gate 416 and is applied to the J input of the flip-flop 404. The 0 output of the flip-flop 404 is passed through the gate 408, inverted by a NOR-gate 418, and applied in inverted form to the J terminal of the flip-flop 402. This same signal is again inverted by a gate 420 and is applied to the K terminal of the flip-flop 402. The result of all of this is that the output of the flip-flop 404 is directly applied to the input of the flip-flop 402, while the output of the flip-flop 402 is inverted or reversed before it is applied to the input of the flip-flop 404. The switch tail is therefore at the output of the flip-flop 402. If the terminal X were made positive and the terminal Y were grounded, the gates 410 and 412 would be enabled, and the switch tail would be moved to the output of the flip-flop 404. This simple modification of the basic control circuit 102 (FIG. 3) makes it possible to reverse the direction of the stepping motor 100 by applying appropriate signals to the terminals X and Y.

The remaining elements of FIG. 6 are, for the most part, similar to those shown in FIG. 3. An H. F. CLOCK signal is applied to a gate 422 continuously. In this particular device, the H. F. CLOCK signal is of a higher frequency than the CLOCK signal shown in FIG. 3, and therefore it is necessary to include two binary flip-flop counter stages 426 and 428 which lower the frequency of the H. F. CLOCK pulses before they are applied to the toggle or shift terminal of the flip-flops 402 and 404. When the H. F. CLOCK pulses are allowed to pass through the gate 422, they are inverted by the gate 424, divided by 4 by the counter stages 426 and 428, and fed to the flip-flops 402 and 404. When the flip-flops 402, 404, 426, and 428 have all returned to their initial positions, they enable a gate 430′ to generate a positive pulse which toggles a flip-flop 430. One output of the flip-flop 430 then goes to ground and disables the gate 422. When it is desired to advance the tape, a STEP pulse generated by the circuitry shown in FIG. 2 is fed to the set terminal of the flip-flop 430, thus causing its 1 output terminal to enable the gate 422. The direction of motor travel is controlled by a flip-flop 432. Both the J and K inputs to this flip-flop are normally grounded, so this flip-flop normally remains in the 0 state. This flip-flop generates the X and Y signals mentioned above. Normally the Y signal is positive, and the control circuit 400 functions with the switch tail at the output of the flip-flop 402. When it is desired to reverse the motors, a REV BTP (Reverse and Back Tape) signal is used to set the flip-flop 432, and is maintained so long as it is desired to continuously back the stepping motor. This signal sets the flip-flop 432, and thus causes the X signal to go positive and the Y signal to go to ground. This causes the switch tail to shift to the output of the flip-flop 404. When the REV BTP signal is terminated, the flip-flop 432 remains set until the end of the current four step sequence, at which time it is toggled clear by the gate 430'.

Figure 7:
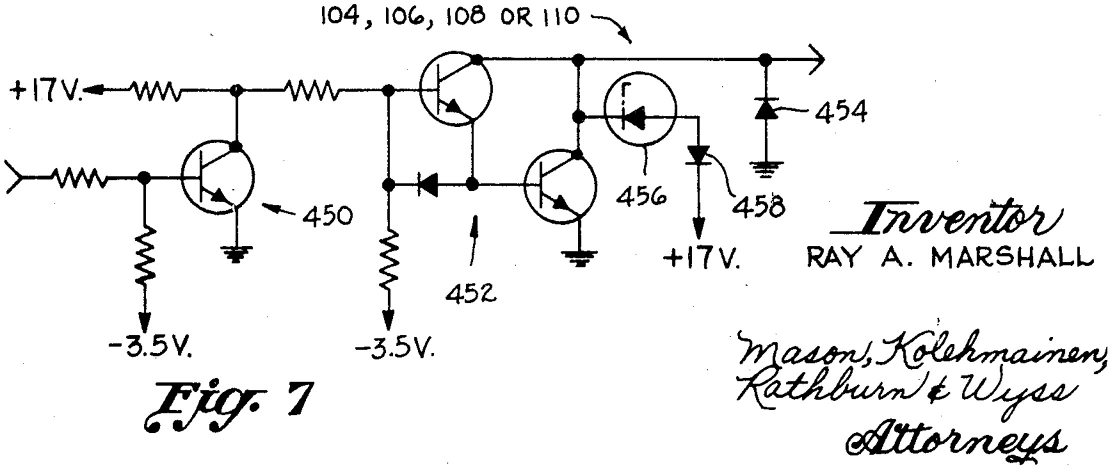
FIG. 7 is a schematic diagram of a level converter suitable for use as elements 104, 106, 108 and 110 in FIG. 3.

FIG. 7 shows a level converter circuit suitable for use as a level converters 104, 106, 108, and 110 in FIG. 3. The low level input logic signals is inverted and amplified by a one transistor inverting amplifier 450.

The signal is then further amplified and again inverted by a two transistor amplifier 452, and is ultimately applied directly to a winding of the stepping motor 100. A diode 454 prevents the output of the level converter from going negative in response to ringing of the motor secondary, and a zener diode 456 prevents the output of the level converter from going excessively positive. A diode 458 prevents the zener diode 456 from interfering with the operation of the amplifier 452 when the zener diode 456 is not reversed biased.

Figure 9:
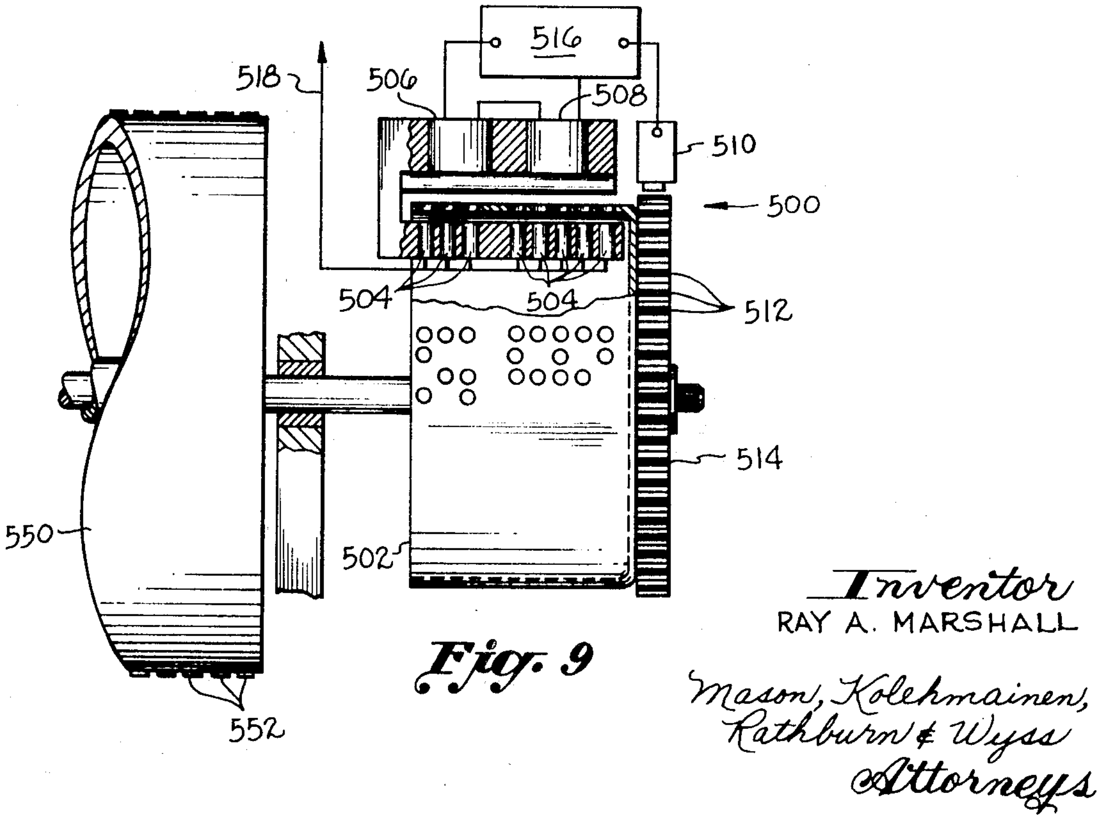
FIG. 9 is an elevational view, partly in section, of a reader device which utilizes the circuitry shown in FIG. 8 to control a drum printer.

FIG. 9 shows a reader designed in accordance with the present invention that is used to scan a perforated code cylinder which rotates with a type carrying printing drum designed for use in a high speed line printer. The optical arrangement is similar to that shown in FIG. 1, in that the code cylinder 502 rotates between an array of photodetectors 504 and two light emitting diodes 506 and 508. An inductive pickup device 510 is provided to detect iron teeth 512 on a gear assembly 514 that rotates along with the code cylinder 502. The gear teeth 512 are arranged so that each tooth is positioned adjacent a perforated code group. When the code cylinder 502 is properly aligned as indicated by the position of the iron gear teeth 512, the inductive pickup 510 causes a control circuit 516 to energize the light emitting diodes 506 and 508. The resultant signals from the photodetectors 504 are transmitted along data lines 518 to comparison circuits which will be described briefly below.

Figure 8:
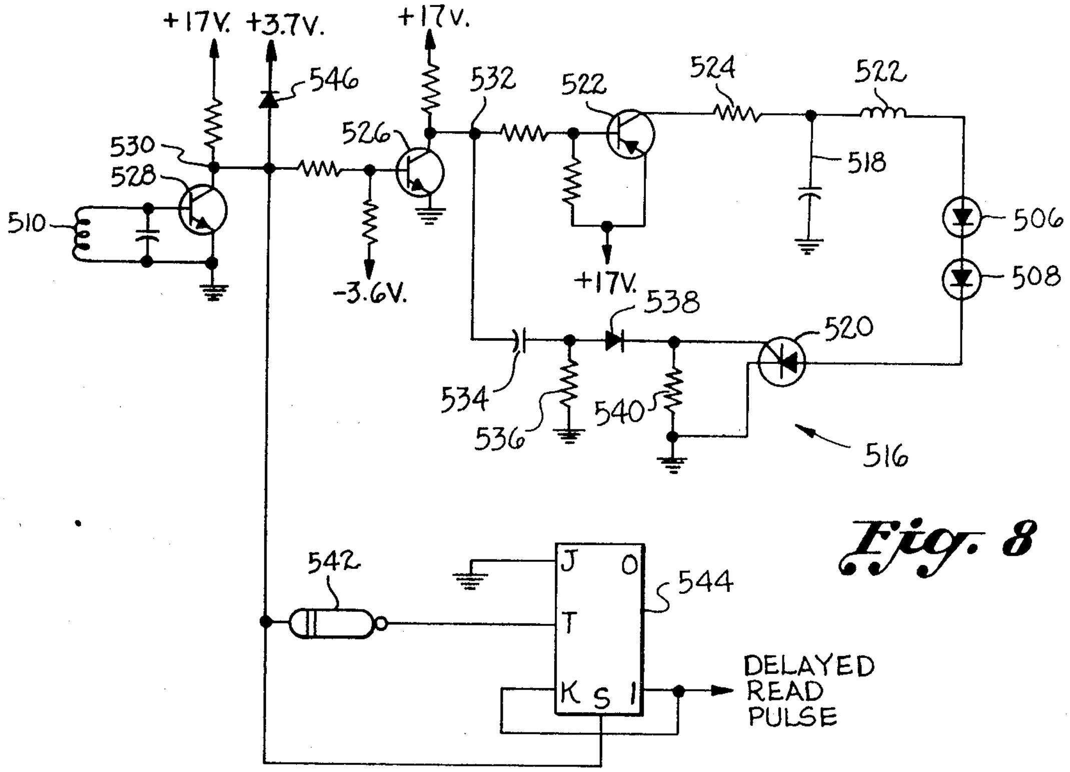
FIG. 8 is a combined schematic and logic diagram of a light emitting diode energization circuit suitable for use with a reader utilizing an inductive pickup coil for synchronization.

FIG. 8 shows the details of the control circuit 516. In many ways, the circuit 516 resembles the circuitry shown schematically in FIG. 1. The light emitting diodes 506 and 508 are connected serially between an energy storage capacitor 518 and a silicon controlled rectifier 520. The diodes are illuminated each time the silicon controlled rectifier 520 is triggered with a positive going pulse. A coil 522 slows down the discharge of the capacitor 518 and extends the time duration of the illumination interval. The rectifier 520 is turned off by current starvation. A transistor 522 controls the flow of leakage charging current through a resistor 524 to the capacitor 518. During the interval which follows the triggering of control rectifier 520, the transistor 522 is rendered nonconductive by a transistor 526. This stops the flow of current to the silicon controlled rectifier 520, and starves it into nonconduction. When the voltage induced in the inductive pickup coil 510 by the teeth 512 swings positive, it causes a transistor 528 to conduct. The collector 530 of the transistor 528 goes negative and renders the transistor 526 nonconductive. The collector 532 of the transistor 526 goes positive. This turns off the transistor 522, and also causes a differentiating circuit, comprising a capacitor 534 and a resistor 536, to generate a pulse which is passed through a diode 538 to the trigger terminal of the silicon controlled rectifier 520. The diode 538 prevents negative going pulses from reaching the trigger terminal and possibly breaking down the rectifier 520. A resistor 540 reduces the magnitude of leakage current through the controlled rectifier 520. The rectifier 520 connects the light emitting diodes 506 and 508 across the energy storage capacitor 518, and thus illuminates the diodes 506 and 508.

Since it takes the photodetectors 504 (FIG. 9) a small amount of time to respond fully, it is desirable to provide a pulse (which comes on later) to the logic which is to process the signal 518 (FIG. 9). This read pulse is generated by passing the negative going level change appearing at the collector 530 through a time delay 542 to the toggle input of a flip-flop 544. The output of the flip-flop 544 is called the DELAYED READ pulse. The flip-flop 544 is returned to its rest state when the collector 530 once again goes positive. This positive level is applied to a set terminal of the flip-flop 544.

The collector 530 of the transistor 528 goes positive when the voltage across the inductor 510 again goes negative. This positive level change causes the transistor 526 to conduct and to pull the collector 532 to ground, thus rendering the transistor 522 conductive and renewing the source of leakage charge current for the capacitor 518. A diode 546 prevents the collector voltage of the transistor 530 from going so far positive as to damage the low level logic elements 542 or 544.

Referring once more to FIG. 9, a brief description of the drum printer 500 will be given. A type drum 550 includes circumferential bands 552 of type spaced around its perimeter along its entire length. The drum 550 rotates at a high speed. Paper upon which material is to be printed is placed adjacent the drum 550, and print hammers are placed behind the paper. Printing is accomplished by causing the print hammers to press the paper against the drum 550 when an appropriate character is opposite the print hammer. The print hammers are controlled by binary comparator circuits. One input to each binary comparator circuit is the binary representation of the symbol which is to be printed. The other input to the comparator circuit is the data presented by the data lines 518 coming from the photodetectors 504. When the perforation code for the character which is to be printed is properly aligned above the photodetectors 504, binary data is transmitted along the line 518 to the comparison circuits. The comparison circuits are actuated by the DELAYED READ pulse (FIG. 8). If this binary data matches a data presented at the other input to a comparator, the comparator causes a print hammer to strike the drum, thereby causing a character to be printed.

Although the present invention has been described with reference to illustrative embodiments thereof, it should be understood that numerous modifications and changes will readily occur to those skilled in the art, and it is therefore intended by appended claims to cover all such modifications and changes as fall within the true spirit and scope of the invention.

What is claimed as new and desired to be secured by letters Patent of the United States is:

1. A drive mechanism for advancing paper comprising:

a stepping motor mechanically coupled to said paper, said stepping motor having four windings;

a switch-tail register including two flip-flops, each flip-flop having two outputs of opposite polarity, and further including a shift input terminal;

circuit means for connecting each output to one of said windings, and for energizing or deenergizing each winding in accordance with the polarity of the output to which it is connected; and shift register advance means for supplying a fixed plurality of shift signals to said shift input terminal each time it is desired to advance the paper, whereby said stepping motor advances a fixed plurality of steps each time said advance means is activated.

2. A drive mechanism in accordance with claim 1 wherein said shift register advance means comprises:

a source of clock pulses;

a first gate having as input signals an output signal from each of the two flip-flops, and having an output signal;

a second gate having as input signals the clock pulses and the output signal from said first gate, and having an output signal that is fed to said shift input terminal; and toggle means for toggling one of the flip-flops whenever it is desired to advance the paper;

whereby the stepping motor advances four positions each time the toggle means is actuated.

3. A drive mechanism in accordance with claim 2 and further including a third flip-flop connected between the output of said first gate and an input to said second gate, said third flip-flop having an additional input, whereby said third flip-flop also serves as the toggle means.

4. A drive mechanism in accordance with claim 2 wherein the toggle means comprises an additional direct input into one of the shift register flip-flops.

5. A drive mechanism in accordance with claim 2 and further including reversing means for changing the position of the switch tail whenever it is desired to advance the stepping motor in the opposite direction.

6. An apparatus for reading groups of data bits from an elongated medium in parallel and for converting this data into a serial teleprinter code, said apparatus comprising:

a shift register having the capacity to hold at least as many data bits as there are bits in each group, said shift register having a parallel data input, a parallel data output, a serial data output, and a shift signal input;

data reading means for reading groups of data bits from said medium and for loading said data into the parallel data input of said shift register;

medium advancing means for advancing the elongated medium after each data group is read;

shift signal generating means connected to said shift signal input for shifting data bits out of said shift register to form a serial teleprinter code after each data group is read; and a gate which receives as input signals the parallel data output of said shift register and which generates a signal when said shift register is empty, which signal activates said data reading means to read another group of data.

7. An apparatus in accordance with claim 6 wherein the shift register includes an output flip-flop which does not receive an input data bit and which does not supply an output signal to said gate, and which therefore can hold the final "-stop" bit in a unit of teleprinter code until the next unit of code is ready for transmission.

8. An apparatus in accordance with claim 6 wherein:

the data reading means generates a bit signal representing each data bit in each group;

the parallel data input to the shift register comprises a plurality of lines;

and wherein each of these lines can be connected to any one of said bit signals, to a potential representing a start bit, to a potential representing a stop bit, or to a potential representing an unused shift register section;

whereby the resultant apparatus can be easily reprogrammed to generate any desired teleprinter code pattern containing any desired number of bits, and whereby no time is ever lost in the transmission of unused bits.

9. An apparatus in accordance with claim 7 to which has been added means for detecting a particular code group, and for inhibiting said signal generating means from forming a serial teleprinter code from this code group.

10. An apparatus in accordance with claim 6 to which has been added means for detecting a particular code group, and means for clearing flip-flops within the shift register when this code group is detected, whereby no time is lost in the transmission of this code group.

11. An apparatus for detecting code perforations in a moveable member comprising:

a plurality of photodetectors positioned on one side of said moveable member;

at least one light emitting diode positioned on the opposite side of said moveable member from said photodetectors;

energy storage means comprising a capacitor for storing sufficient energy to illuminate said diodes, but not sufficient energy to damage said diodes;

energy transfer means comprising a series circuit connected across said capacitor, said series circuit including said photodiodes and also a current switching device, said energy transfer means rapidly transferring energy from said energy storage means into said diodes whenever it is desired to detect said code perforation; and trickle charging means for recharging said capacitor.

12. An apparatus for detecting code perforations in a moveable member comprising:

a plurality of photodetectors positioned on one side of said moveable member;

at least one light emitting diode positioned to the opposite side of said moveable member from said photodetectors;

energy storage means comprising a capacitor for storing sufficient energy to illuminate said diodes, but not sufficient energy to damage said diodes;

energy transfer means comprising a series circuit connected across said capacitor, said series circuit including said photodiodes and also a current switching device, said switching device being a controlled rectifier;

trickle charging means for recharging said capacitor; and turnoff means for turning off said controlled rectifier.

13. An apparatus in accordance with claim 12 wherein the turnoff means comprises an L-C circuit connected across the controlled rectifier.

14. An apparatus for detecting code perforations in a moveable member comprising:

a plurality of photodetectors positioned on one side of said moveable member;

at least one light emitting diode positioned on the opposite side of said moveable member from said photodetectors;

energy storage means comprising a capacitor for storing sufficient energy to illuminate said diodes, but not sufficient energy to damage said diodes;

energy transfer means comprising a series circuit connected across said capacitor, said series circuit including said photodiodes and also a current switching device which switching device is a controlled rectifier, for rapidly transferring energy from said energy storage means into said diodes whenever it is desired to detect said code perforations; and gateable trickle charging means that can be stopped whenever it is desired to starve the controlled rectifier into nonconduction.

15. A high-speed printer comprising:

a rotating drum carrying a plurality of circumferential arrays of type;

a plurality of type hammers mounted adjacent said drum;

a plurality of binary code comparators each having two binary code inputs and arranged to activate said type hammers when supplied with matching codes;

data presentation means for presenting a code which is to be printed to a first binary code input of each comparator;

a wheel attached to and rotating with said drum, said wheel bearing circumferentially spaced code groups aligned with the type in said circumferential arrays;

code reading means positioned adjacent said code wheel;

magnetic elements imbedded in said code wheel and aligned with the type in said circumferential arrays;

an inductive pickup positioned adjacent the path along which said magnetic elements move; and circuit means responsive to signals from said inductive pickup for activating said code reading means and for feeding the data read to the remaining input of each comparator.

* * * * *